United States Patent [19]
Ueda et al.

[11] Patent Number: 5,969,332
[45] Date of Patent: Oct. 19, 1999

[54] SYSTEM FOR ISSUING AND UTILIZING TICKET

[75] Inventors: Masaaki Ueda, Katano; Takuya Oka, Hirakata; Shigeo Aoki, Ikama, all of Japan

[73] Assignee: Matsushita Electric Industrial Co., Ltd, Osaka, Japan

[21] Appl. No.: 08/836,548

[22] PCT Filed: Aug. 30, 1996

[86] PCT No.: PCT/JP96/02462

§ 371 Date: Jul. 21, 1997

§ 102(e) Date: Jul. 21, 1997

[87] PCT Pub. No.: WO97/08663

PCT Pub. Date: Jun. 3, 1997

[30] Foreign Application Priority Data

Aug. 30, 1995 [JP] Japan ..................................... 7-221378

[51] Int. Cl.[6] ................................................. G06N 19/06
[52] U.S. Cl. .......................................... 235/492; 235/322
[58] Field of Search ..................................... 235/381, 382, 235/380, 392, 494, 492, 38, 441; 364/479.01, 479.05, 479.07

[56] References Cited

U.S. PATENT DOCUMENTS

| | | | |
|---|---|---|---|
| 5,131,516 | 7/1992 | Clough | 194/205 |
| 5,239,480 | 8/1993 | Huegel | 364/479 |
| 5,371,346 | 12/1994 | Menoud | 235/381 |
| 5,485,520 | 1/1996 | Chaum et al. | 380/24 |
| 5,491,326 | 2/1996 | Marceau et al. | 235/381 |

FOREIGN PATENT DOCUMENTS

| | | |
|---|---|---|
| 6-274709 | 9/1994 | Japan . |
| 7-78225 | 3/1995 | Japan . |

*Primary Examiner*—Thien Minh Le
*Attorney, Agent, or Firm*—Ratner & Prestia

[57] ABSTRACT

An object is to provide a system for issuing and utilizing a ticket with which a passenger, using an IC card, can purchase a ticket and pass through a ticket gate, the structure being a non-contact terminal memories the non-contact signal transmitted from a ticket-selling machine and involving the permitted-section information corresponding to the section the passenger is aboard the train, and exchanges the permitted section information between the non-contact terminal and the ticket gate.

10 Claims, 3 Drawing Sheets

SYSTEM FOR ISSUING AND UTILIZING TICKET

FIELD OF INVENTION

The present invention relates to a system for issuing and utilizing tickets that can treat information on ticket-purchasing by utilizing IC cards and non-contact terminals, without needs of any contacting. The non-contact terminal hereunder called for convenience in this specification is a kind of computer that gives information to or receives information from the relating outside apparatus by way of electromagnetic waves.

BACKGROUND TECHNOLOGY

In the past, if a passenger wants to utilize a train or such, he must first purchase a ticket (including a commutation ticket), which has a record of the purchasing information, with cash or a prepaid card from a ticket-selling machine or from a station employee, and thereafter insert the ticket into the slot of the ticket gate.

DISCLOSURE OF INVENTION

The present invention aims to provide a system for issuing and utilizing tickets, which makes it possible for a passenger to obtain the ticket, confirming the money amount information and without any contacting, and to pass the ticket gate without any contacting, by utilizing an IC card with description of the amount of money and a non-contact terminal which can transmit and/or receive information on the permitted section (the section permitted for his being aboard) without contacting.

A system for issuing and utilizing a ticket for attaining the above object comprises:

a non-contact terminal having;

an antenna to transmit and/or receive a non-contact signal, a non-contact-signal-receiving-decoding means to read out the information involved in the received non-contact signal, a communication control means to transfer the decoded information to the CPU, a non-volatile memory to store the information, a non-volatile-memory-write-in means and a non-volatile-memory-read-out means to write information in and to read information from the non-volatile memory, a non-contact-signal-transmitting means to transform the information to the non-contact-signal, an IC-card-reader and IC-card-reading means to read the information stored in the IC card, a character-displaying panel and character- displaying means to display the information in a form to be recognized from the outside, and a CPU to control said each means;

a ticket-selling machine having; an IC card reader to read out the information in the IC card, and an antenna to transmit the non-contact signal; and a ticket gate:

wherein;

said non-contact terminal, when the IC card is inserted into the IC card reader, reads out the information stored in the IC card, and displays it on the character-displaying panel, the ticket-selling machine, reads out, when a ticket is purchased, the money amount information stored in the IC card by the IC card reader, and transmit the non-contact signal involving the permitted-section information corresponding to the section, over which the passenger is aboard the train, and, on the other hand, receives the non-contact signal involving said permitted-section information, and writes into the non-volatile memory the permitted-section information which is decoded and transferred through the non-contact-signal-receiving-decoding means, the communication control means, and the non-volatile-memory-write-in means which are controlled by the CPU, and when the passenger passes through the ticket gate, said CPU, which is a part of said non-contact terminal, controls, responding to the on-board-section confirming information which was transmitted from the ticket gate and decoded and transferred at the non-contact-signal-receiving-decoding means and communication-controlling means, said non-volatile-memory-read-out means, to read out the permitted-section information stored in said non-volatile memory, and transmits the non-contact signal involving the permitted-section information via the communication control means and the non-contact-signal transmitting means.

The non-contact-terminal in the system for issuing and utilizing ticket of the present invention has also a function of IC card reader of contact type. When the IC card with description of the amount of money is inserted to the IC card reader of the non-contact terminal, the money amount information is displayed on the character display panel, and the amount of money memorized in the IC card can be confirmed.

When a user inserts the IC card into a ticket-selling machine and selects the section he wishes to be abroad, the non-contact-terminal receives the non-contact-signal involving the permitted-section information which is transmitted from the ticket-selling machine and writes and memorizes the permitted-section information into the non-volatile memory incorporated in the non-contact-terminal.

Furthermore, this non-contact-terminal receives the non-contact-signal involving the permitted-section information which is transmitted from the ticket gate, reads the permitted-section information through the non-volatile memory and transmits the non-contact signal making the permitted-section information involved to the ticket gate.

Also, by providing the non-contact terminal with a button for the permitted-section-information-transmitting, the terminal reads, by the button pressing, the permitted-section information from the non-volatile memory, makes it involved in the non-contact signal, and transmits to the ticket gate, without any necessity of transmitting the non-contact signal involving the permitted-section confirming information from the ticket-gate outside. By this, the ticket gate confirms the permitted-section information to allow the passenger to enter therethrough.

On the other hand, if the passenger, when going out through the ticket gate, pushes the permitted-section-information-transmitting-button, the non-contact terminal, likewise as at the entrance, reads out the permitted-section information from the non-volatile memory, and makes it involved in the non-contact signal to transmit to the ticket gate outside. The ticket gate confirms the permitted-section information, and, if it is within the permitted-section, transmits the non-contact signal involving the section-termination information to the non-contact terminal, and allow him to go out through the ticket gate. The non-contact terminal receives the section-termination information transmitted from the ticket gate, to make it impossible for the permitted-section information to be utilized again, to prevent the illegal utilization of the permitted section-information.

While said permitted-section-information-transmitting-button is used, in the way, to transmit the permitted-section information to the ticket gate, it is further used, when the permitted-section-information-transmitting-button of the non-contact terminal is pushed at a place other than the ticket gate, the non-contact terminal is, by adding a function to transform the permitted-section information to characters and to display on the character-displaying-panel, able to make the passenger easily confirm the permitted-section information.

Instead in the IC card, it is possible to form a structure to store the money amount information in the non-volatile memory of the non-contact terminal which transmits the money amount information to the ticket-selling machine. The ticket-selling machine, not only transmits back to the non-contact terminal the permitted-section information corresponding to the section the passenger selected, but also transmits to the non-contact terminal further money amount information which is obtained by subtracting the fair of the section the passenger was aboard from the money amount information sent by the non-contact terminal.

Further, the non-contact terminal is provided with a permitted-section-information-transmitting-button and a transmitting-button-read-out means, and, if the permitted section information is read out by pushing down the permitted-section-information-transmitting-button via said transmitting-button-read-out means, the non-contact terminal, reads out, without necessitating the transmission of the non-contact signal involving the permitted-section-confirming-information from the outside ticket-gate, the permitted-section-information from the non-volatile memory via the non-volatile-memory-read out means, and sends the permitted section information which is made to be involved in the non-contact signal via the non-contact-signal-transmitting part to the outer ticket gate.

The non-contact-terminal has further such a structure that, if the permitted-section-information transmitting button is pushed down by way of the transmitting-button-read-out means, it transforms the permitted section information to characters to display them on the character-displaying panel.

According to the above described structure, the passengers, by utilizing IC cards with money amounts written-in and the non-contact-terminals which can transmit and receive the permitted-section information without contacting, are able, at any time, to confirm the current money amount, obtain the desired permitted-section information without contacting, and pass through the ticket-gate without contacting.

BEST CONFIGURATION TO EMBODY INVENTION

Figure 1:
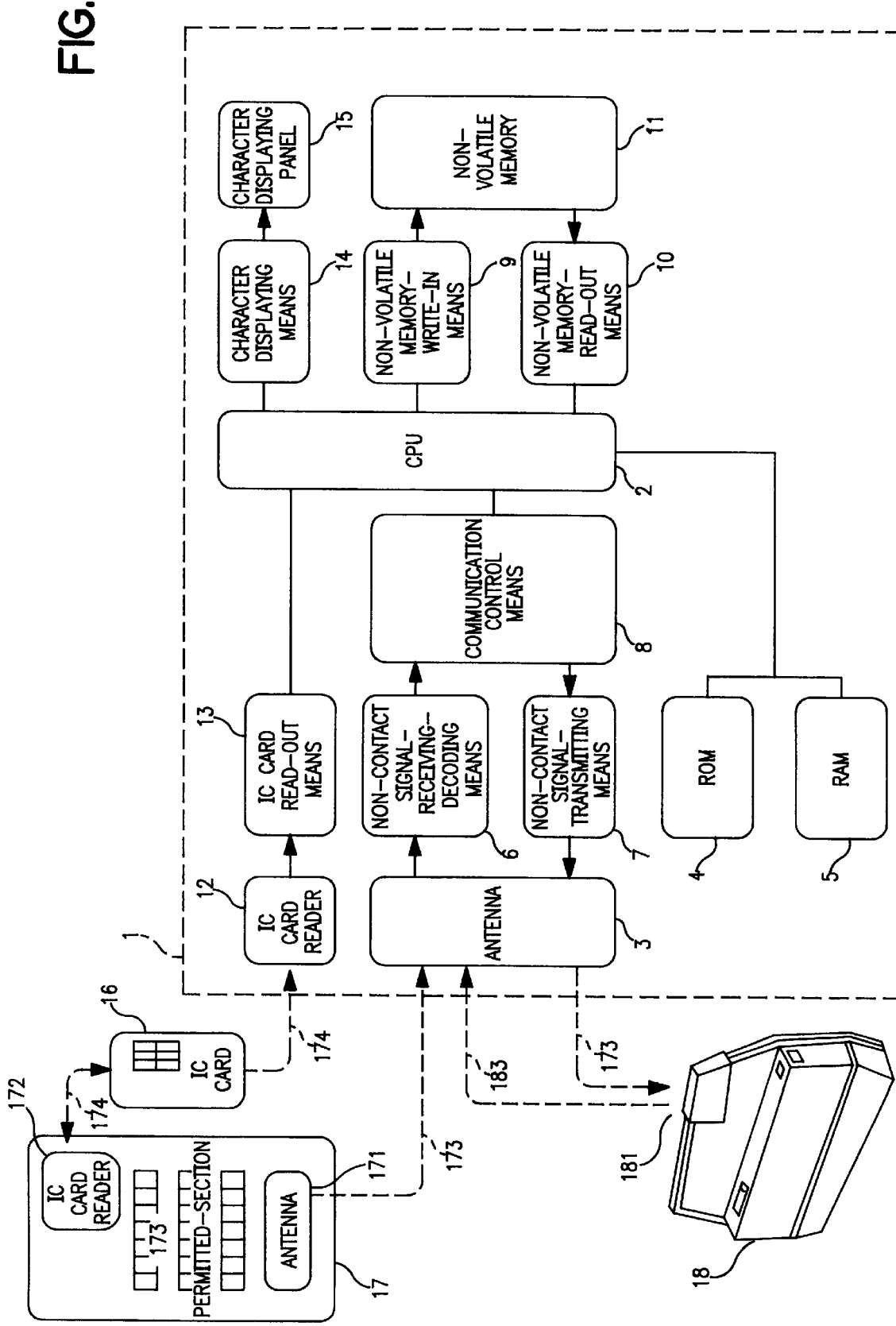
FIG. 1 is a block diagram of an embodiment of a ticket issuing and utilizing system according to the present invention.

In the following, configurations of the ticket issuing and utilizing system according to the present invention are explained in detail, referring to the drawings.

(Embodiment 1)

FIG. 1 is a block diagram of a non-contact terminal used for a first embodiment of the present invention.

With FIG. 1, the inside structure and the function of a non-contact terminal 1 is explained. The non-contact terminal 1 comprises; a ROM 4 to store the control program, a RAM 5 for storing various data, a CPU 2 to perform various controls based on the various programs in ROM 4, an antenna 3 to receive the non-contact signal transmitted from a ticket-selling machine 17 and a ticket gate 18, a non-contact-signal-receiving-decoding means 6 to decode the non-contact signal and extract the permitted-section information 173 transmitted from the ticket-selling machine 17 or section confirmation information 183 from the ticket gate 18, a communication control means 8 to transfer the decoded information to CPU 2, a non-volatile-memory-write-in means 9 to write the permitted-section information 173 into the non-volatile memory 11, a non-volatile-memory-read-out means 10 to read out the written-in permission-information from the non-volatile memory 11, a non-contact-signal-transmitting means 7 to transmit the non-contact signal involving the permitted section information 173 to the ticket gate 18, an IC card reader 12, an IC-card-read-out means 13 to receive the money amount information 174 via IC card reader 12 from an IC card 16, and a character-displaying means 14 to transform the money amount information 174 to the character to display on a character-displaying panel 15.

In the following, explanation is made of the giving and receiving of information between the non-contact terminal, the ticket-selling machine and the ticket gate, when a passenger utilizing the non-contact terminal of the above described structure, purchases the ticket and passes the ticket gate.

When a passenger purchases a ticket, he inserts the IC card into IC card reader 12 of the ticket-selling machine and selects the section he wishes to be aboard. Then, the non-contact signal involving the permitted-section information 173 corresponding to the selected section is transferred from the ticket-selling machine to the non-contact-terminal and is written into the non-volatile memory. At this time, by inserting the IC card into the IC card reader of the non-contact terminal, the balance stored in the IC card is certified by the character panel of the non-contact terminal.

On the other hand, if a passenger passes a ticket gate, the permitted-section information 173, which has been written in the non-volatile memory of the non-contact terminal from the ticket-selling machine, is read out from the non-volatile memory, included in the non-contact signal, and transmitted to the ticket gate, which can thus confirm the permitted-section information 173 of the passenger.

Thus, the non-contact terminal gives and receives information without any contacting and the information is written into or read out from the non-volatile memory. In the non-contact terminal of the present embodiment, the writing of the permitted-section information 173 which has been involved in the non-contact signal transmitted from the antenna 171 of the ticket-selling machine 17 into the non-volatile memory 11 is carried out as follows.

The non-contact signal involving the permitted-section information 173 corresponding to the section which the passenger selected to be aboard over is transmitted from the antenna 171 of the ticket-selling machine to the non-contact terminal. The non-contact signal received by the antenna 3 is transferred to the CPU 2 via the non-contact-signal-receiving-decoding means 6 and the communication control means 8. The CPU 2 takes out the permitted-section information 173 from the transferred information, and controls so as to write the permission information into the non-volatile memory 11 by the non-volatile-memory-write-in means 9.

On the other hand, when the passenger passes through the ticket-gate, the permitted-section confirmation information 183 which has been involved in the non-contact signal transmitted from the antenna 181 of the ticket gate 18 is decoded and the non-contact signal involving the permitted-section information 173 stored in the non-volatile memory 11 is transmitted to the outer ticket gate.

The non-contact signal received by the antenna 3 is transferred to the CPU 2 through the non-contact-signal-receiving-decoding means 6 and the communication control means 8. The CPU 2, likewise as described above, takes out the being-aboard-section-confirmation information 183 from the non-contact signal. Further, the CPU 2 reads out, by the read-out means 10, the permitted-section information 173 written in the non-volatile memory as a result of the above described process. The permitted-section information 173 read out from the non-volatile memory is transformed to the non-contact signal involving the permitted-section information 173 by the communication control means 8 controlled by the CPU and the non-contact-signal-transmitting means 7, and is transmitted to the ticket gate 18 through the antenna 3.

Further, the non-contact terminal of the present embodiment is controlled by the CPU 2 so as to read out the money amount information 174 from the IC card 16 by the IC-card-read-out means 13 via the IC card reader 12, and, transforming the money amount information 174 to the characters, displays on the character-displaying panel 15 via the character-displaying means 14.

(Embodiment 2)

Figure 2:
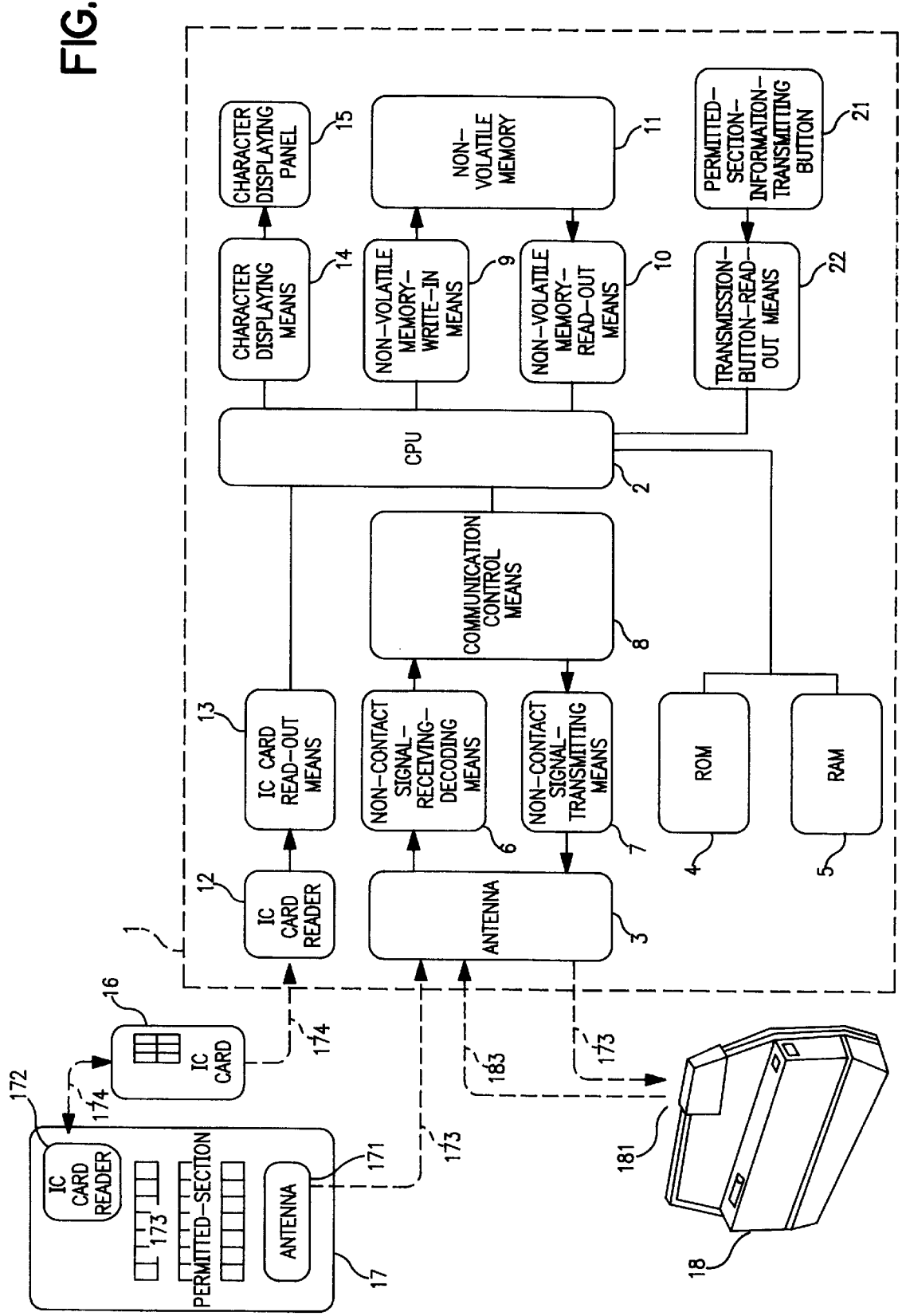
FIG. 2 is a block diagram of a second embodiment of a ticket issuing and utilizing system according to the present invention.

FIG. 2 shows a second embodiment based on the present invention. The present non-contact terminal 1 is of such a structure that, being provided with a permitted-section-information-transmitting button 21 and a transmitting-button-read-out means 22, when said permitted-section-information-transmitting button 21 pushed down is read out via said transmitting-button reading out means 22, the permitted-section information read out from said non-volatile memory 11 via said non-volatile-memory-read-out means 10 can be made involved in the non-contact signal and be transmitted through said non-contact-signal-transmitting means 7, and the permitted section information is transformed to the character to be displayed on the character-displaying panel 15 via the character-displaying means 14. Further, it has a structure that it decodes the being-aboard-section-termination information 184 which is involved in the non-contact signal transmitted from the antenna 181 of the ticket gate 18 to make the repeated use of the permitted section information stored in the non-volatile memory 11 impossible. The structure of the other parts is the same as in Embodiment 1.

(Embodiment 3)

Figure 3:
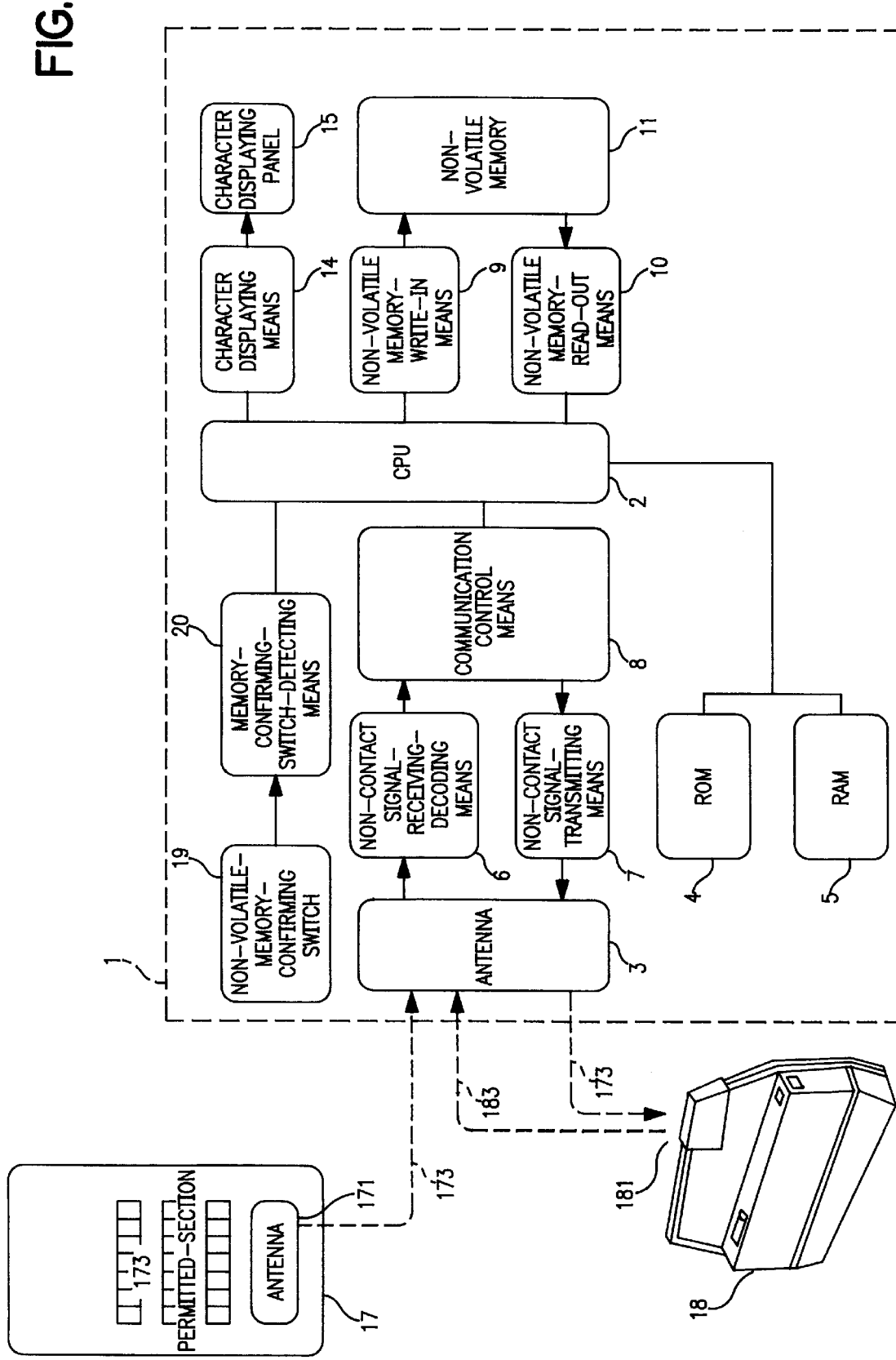
FIG. 3 is a block diagram of a third embodiment of a ticket issuing and utilizing system according to the present invention.

FIG. 3 shows a third embodiment based on the present invention. The non-contact terminal 1 in the present embodiment is provided with, instead of the IC card reader placed in the non-contact terminal in the above Embodiment 1, a means to confirm the memory stored in the non-volatile memory, and, of the structure of the other part is the same as in the non-contact terminal described in Embodiment 1. The memory-confirming means consists of a non-volatile-memory-confirming switch 19 and a memory-confirming-switch-detecting means 20. When a user pushes the non-volatile-memory-confirming switch 19, the memory-confirming-switch-detecting means 20 detects the pushing of the switch 19 to transfer to the CPU 2. The CPU 2 reads out the contents stored in the non-volatile memory 11, to transform to the character information to transfer to the character-displaying means. Thus, the contents stored in the non-volatile memory of the non-contact terminal is displayed on the character-displaying panel 15.

Also, the money amount information 174 read out from said non-volatile memory 11 by the non-volatile-memory-read-out means 10 is made involved in the non-contact signal, and is transmitted to the ticket-selling machine via said non-contact-signal-transmitting means 7. The ticket-selling machine 17 transmit to the non-contact terminal the new-money-amount-information which is obtained by subtracting the fair or the expense corresponding to the section the user selected from the money amount information gained from the non-contact terminal as well as the permitted-section information.

The new money amount information is, along with the permitted section information, by the similar means as in the above Embodiment 1, written into the non-volatile memory.

In the above described embodiments, the money amount information 174 is stored in the IC cards, and, when a ticket is purchased the IC card and the non-contact terminal are used together. On the contrary, in the non-contact terminal shown in FIG.3 not only the permitted-section information 173 but also the money amount information are stored in the non-volatile memory 11, and the use of the IC card is not made.

As explained above, with the IC card issuing/utilizing system of the present invention the passenger can obtain desired permitted-section information 173 without contacting and pass through the ticket gate without contacting, by utilizing the IC card 16 with money amount written in and the non-contact terminal 1 which can transmit and receive the permitted-section information 173 without contacting. Further, he can, by inserting the IC card into the IC card reader of the non-contact terminal, confirm the current money amount. Also, by writing the money amount information 174 into the non-volatile memory in the non-contact terminal, the money amount and the permitted-section information 173 can be transferred without the use of an IC card but of the non-contact terminal only.

Furthermore, the ticket issuing/utilizing system according to the present information, with which the money amount written in the IC card can be used freely by the user, can have the similar advantages when used, instead of the permitted-section information for the use in the railroading, for the entrance permission information of an institution.

POSSIBLE UTILITY IN INDUSTRY

The system of issuing and utilizing a ticket according to the present invention, by utilizing the non-contact terminal with the above described structure to transmit and receive the permitted section information between the ticket-selling machine and the ticket gate, makes the purchase and issue of tickets and passing through of a ticket gate without contacting possible.

Table of Marks in Drawings

1 Non-contact terminal
2 CPU
3 Antenna
4 ROM
5 RAM
6 Non-contact-signal-receiving-decoding means

| Table of Marks in Drawings |
| --- |
| 7   Non-contact-signal-transmitting means |
| 8   Communication control means |
| 9   Non-volatile-memory-write-in means |
| 10  Non-volatile-memory-read-out means |
| 11  Non-volatile memory |
| 12  IC card reader |
| 13  IC-card-read-out means |
| 14  Character-displaying means |
| 15  Character-displaying panel |
| 16  IC card |
| 17  Ticket-selling machine |
| 18  Ticket gate |
| 19  Non-volatile-memory-confirming switch |
| 20  Memory-confirming-switch-detecting means |
| 21  Permitted-section-information-transmitting button |
| 22  Transmission-button-read-out means |
| 171 Antenna |
| 173 Permitted-section information |
| 174 Money amount information |
| 181 Ticket gate antenna |
| 183 Being-aboard-section-confirmation information |
| 184 Being-aboard-section-termination information |

We claim:

1. A system for issuing and utilizing a machine readable medium, comprising:

reading means for reading data from said machine readable medium and generating a first information signal;

a terminal having
an antenna to receive the first information signal from the reading means,
processing means to process the first information signal, and generate a control signal,
means responsive to the control signal for generating a second information signal based on the first information signal and for transmitting the second information signal, a passenger gate for receiving the second information signal, and determining whether entry of a passenger is permitted based on data contained in the second information signal, and a transmitting-control, wherein when the transmitting-control is activated, the terminal transmits the second information signal to the passenger gate, wherein
when a passenger passes through the passenger gate, said terminal transmits the second information signal to the passenger gate indicating whether entry of the passenger is permitted, and
wherein said terminal
i) transmits the second information signal to the passenger gate and transmits a third information signal which causes the passenger gate to allow the passenger to pass through the passenger gate when the passenger exits, and
ii) receives a fourth information signal transmitted from the passenger gate indicating that the passenger has passed through the passenger gate.

2. A system for issuing and utilizing a machine readable medium comprising:

reading means for reading data from said machine readable medium and generating a first information signal;

a terminal having
an antenna to receive the first information signal from the reading means,
processing means to process the first information signal, and generate a control signal,
means responsive to the control signal for generating a second information signal based on the first information signal and for transmitting the second information signal, a passenger gate for receiving the second information signal, and determining whether entry of a passenger is permitted based on data contained in the second information signal, a transmitting-control, wherein when the transmitting-control is activated, the terminal transmits the second information signal to the passenger gate, and a character display means, wherein the terminal converts the first information signal to a character format and displays the character format on the character display means when the transmitting-control is activated, wherein
when a passenger passes through the passenger gate, said terminal transmits the second information signal to the passenger gate indicating whether entry of the passenger is permitted.

3. A system for issuing and utilizing a machine readable medium comprising:

reading means for reading data from said machine readable medium and generating a first information signal;

a terminal having
an antenna to receive the first information signal from the reading means,
processing means to process the first information signal, and generate a control signal, means responsive to the control signal for generating a second information signal based on the first information signal and for transmitting the second information signal, a passenger gate for receiving the second information signal, and determining whether entry of a passenger is permitted based on data contained in the second signal, a confirming switching means, and a character display means, wherein
when said confirming switching means is activated the processing means reads the information stored in the processing means and displays the information on the character display means,
when the medium is issued, information stored in the processing means of the terminal is transmitted to the reading means, and, thereafter, the reading means transmits the first information signal and the information stored in the processing means is updated, and
when a passenger passes through the passenger gate said terminal transmits the second information signal to the passenger gate indicating whether entry of the passenger is permitted.

4. A system for issuing and utilizing a machine readable medium of claim 1, said terminal further comprises a character display panel, wherein the terminal the permitted-section- information-transmitting button, converts the first information signal to a character format and displays the character format on the character display panel when the transmitting-button is activated.

5. A system for issuing and utilizing a machine readable medium comprising:

reading means for reading data from said machine readable medium and generating a first information signal;

a terminal having an antenna to receive the first information signal from the reading means, processing means to process the first information signal, and generate a control signal, means responsive to the control signal for generating a second information signal based on the first information signal and for transmitting the second information signal, and a passenger gate for receiving the second information signal, and determining whether entry of a passenger is permitted based on data contained in the second information signal, memory means coupled to said processing means, said memory means storing the first information signal and the second information signal responsive to said processing means, and a display to display at least one of the first information signal and second information signal responsive to said processing means, wherein when a passenger passes through the passenger gate, said terminal transmits the second information signal to the passenger gate indicating whether entry of the passenger is permitted.

6. A system for issuing and utilizing a machine readable medium according to claim 5, further compromising:

an IC-card reader to read information from an IC-card, wherein the machine readable medium is the IC-card, and the information from the IC-card is displayed on the display.

7. A system for issuing and utilizing an IC-card comprising:

reading means having an IC-card reader for reading data from said IC-card and generating a first information signal;

a terminal having an antenna to receive the first information signal from the reading means, processing means to process the first information signal, and generate a control signal, means responsive to the control signal for generating a second information signal based on the first information signal and for transmitting the second information signal, and a passenger gate for receiving the second information signal, and determining whether entry of a passenger is permitted based on data contained in the second information signal, and a second antenna to send the first information signal to the terminal, wherein when a passenger passes through the passenger gate, said terminal transmits the second information signal to the passenger gate indicating whether entry of the passenger is permitted.

8. A system for issuing and utilizing a machine readable medium comprising:

a ticket-selling machine having a reader to read information from the machine readable medium and generate a first information signal first communication means for transmitting the first information signal, a terminal having second communication means for receiving the first information signal from the first communication means, a processor to process the first information signal, and generate a control signal, a non-volatile memory to store the first information signal responsive to the control signal, means responsive to the control signal for generating a second information signal based on the first information signal and for transmitting the second information signal from the second communication means, a reader to read the information from the machine readable medium, and a passenger gate for receiving the second information signal, and determining a permitted section for a passenger based on data contained in the second information signal, wherein when a passenger passes through the passenger gate, said terminal transmits the second information signal to the passenger gate indicating whether entry of the passenger is permitted.

9. A system for issuing and utilizing a machine readable medium according to claim 8, wherein the machine readable medium is an IC-card.

10. A system for issuing and utilizing a machine readable medium according to claim 8, further comprising a display to display the information read by the reader.

* * * * *

UNITED STATES PATENT AND TRADE MARK OFFICE
CERTIFICATE OF CORRECTION

PATENT NO. : 5,969,332
DATED : October 19, 1999
INVENTOR(S) : Ueda et al.

It is certified that error appears in the above-identified patent and that said Letters Patent is hereby corrected as shown below:

On the cover page, item [57], the Abstract should read:

--A system for issuing and utilizing a machine readable medium with which a passenger can purchase a ticket and pass through a ticket gate. A terminal stores and processes a signal transmitted from a ticket-selling machine containing information corresponding to the section the passenger is permitted to board and exchanges the information between the terminal and the passenger gate.--

Signed and Sealed this

Ninth Day of January, 2001

*Attest:*

Q. TODD DICKINSON

*Attesting Officer*   Commissioner of Patents and Trademarks